Nov. 9, 1965    C. W. HANSEN    3,216,241
MOISTURE GAUGING SYSTEM
Filed June 23, 1960

INVENTOR.
CARL W. HANSEN
BY
*Weingarten, Ovenluck & Pandiscio*
ATTORNEYS

United States Patent Office 3,216,241
Patented Nov. 9, 1965

3,216,241
MOISTURE GAUGING SYSTEM
Carl W. Hansen, Wayland, Mass., assignor, by mesne assignments, to Laboratory for Electronics, Inc., Boston, Mass., a corporation of Delaware
Filed June 23, 1960, Ser. No. 38,283
5 Claims. (Cl. 73—75)

This invention relates in general to determination of the moisture content of a material and more particularly to a system for determining the moisture content of a material of known composition in a production process line.

In many manufacturing processes, the moisture content of the product being processed is an important quantity to be measured. This is especially true where, at some stage in the manufacturing process, the process is a "wet" process. Thus, for example, the production of paper involves a wet process step and yet the final product is essentially a dry product. In the process of paper manufacture, the paper is rolled into a continuous web while a wet mass and then run through heaters to remove the water. One of the specifications of the final paper is, however, its moisture content; hence some control and measurement of the moisture content after heating is required. In modern manufacturing methods employing automated techniques, a method of determining moisture content at high speed without interrupting the flow of the product is essential. In one method which has been employed in the past in the paper industry, an electrical capacitance gauge provides an indication of the moisture content of the paper. This gauge operates by measuring the dielectric constant of the paper passing through the gauge, which constant is, in turn, dependent upon the moisture content of the paper. The capacitance gauge is, however, subject to errors from two important sources, one being the variation of the dielectric constant with temperature, and the second being variation in measured value of the dielectric constant due to variation in the conductivity of the water. A second method which has been used in the paper industry employs a gauge which is an alternating current resistance gauge measuring the conductivity of the paper as an indication of the moisture content. The latter type of gauge is again subject to error due to variation in conductivity of water, both with temperature and with chemical impurities in the water.

The environment in which an industrial moisture gauge is to be operated imposes certain limitations on the equipment itself. Thus, it must be capable of operating independently of the ambient temperature and the gauge should be capable of providing correct moisture content regardless of the chemical contamination and variance in the water itself.

It is therefore a primary object of this invention to provide an accurate, efficient system for measuring the moisture content of a material in a process line.

It is another object of this invention to provide an accurate, economical moisture gauging system for high speed operation without interrupting the flow of materials in a process line.

It is still another object of this invention to provide an accurate system for determining the moisture content of paper in a paper manufacturing process.

Broadly speaking, the present invention utilizes the relationship between the specific heat of a material and its moisture content to determine the moisture content of the material in a process line. The specific heat of the material is not measured directly, but rather is derived from a series of measurements of other physical characteristics. The specific heat of a material may be expressed mathematically as:

$$c = \frac{H}{M \Delta T}$$

where
$c$=specific heat in calories per gram per degree centigrade
$H$=heat in calories
$M$=mass in grams and
$\Delta T$=change in temperature in degrees centigrade of the mass M caused by the addition of an amount of heat H.

In one preferred embodiment, the apparatus of this invention supplies a measured amount of heat to a portion of the material in the process line and measures the mass of this portion and the temperature rise effected by the heat supplied. From this information the specific heat can then be derived and this value can then be transformed into a value of moisture content by means of the known relation between these two quantities.

These and other objects and advantages will become apparent from the following detailed description when taken in conjunction with the accompanying drawing in which.

Figure 1:
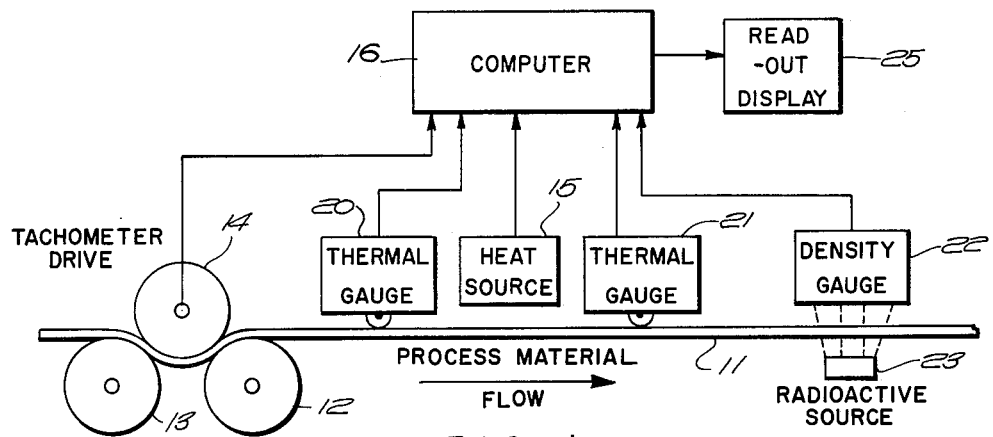
FIG. 1 is an illustration in block diagrammatic form of one embodiment of the apparatus of this invention.

With reference now specifically to FIG. 1, an embodiment of the apparatus of this invention is shown in conjunction with a process line which in this instance is a paper manufacturing process line. The process material sheet 11 is shown being carried through a set of rollers 12, 13, and 14, with roller 14 incorporating a tachometer drive providing as an output the velocity of the material sheet 11 at this point. A heat source 15 is located close to the process material sheet 11 in such a manner as to transfer most of the developed heat to the process material. The tachometer drive 14 output signal and also a signal indicative of the heat developed in heat source 15 are provided to a computer unit 16. A thermal gauge 20 having a rolling contact with the process material 11 provides a continuous indication to the computer 16 of the temperature of the process material before it is subjected to the heat source 15. An identical thermal gauge 21 is located on the downstream side of the heat source 15 and provides to the computer a signal indicative of the temperature of the process material after being subjected to heat source 15. The apparatus also includes a density gauge 22, which is shown as a radioactive density gauge. In this type of gauge, the absorption by the sheet 11 of radiations emitted from radioactive source 23, provides a measure of the weight per unit area of the process sheet. The output of this gauge 22 is supplied to computer unit 16. The computer 16 is a unit capable of correlating and mathematically operating on these input signals to provide an output indicative of the moisture content. A readout element 25 is connected to output of computer unit 16 and displays on a continuous basis the information as supplied from the computer on the moisture content of the process material 11. Typically, this readout element may be a strip recorder which provides a visual indication of the moisture content as a function of time.

Figure 3:
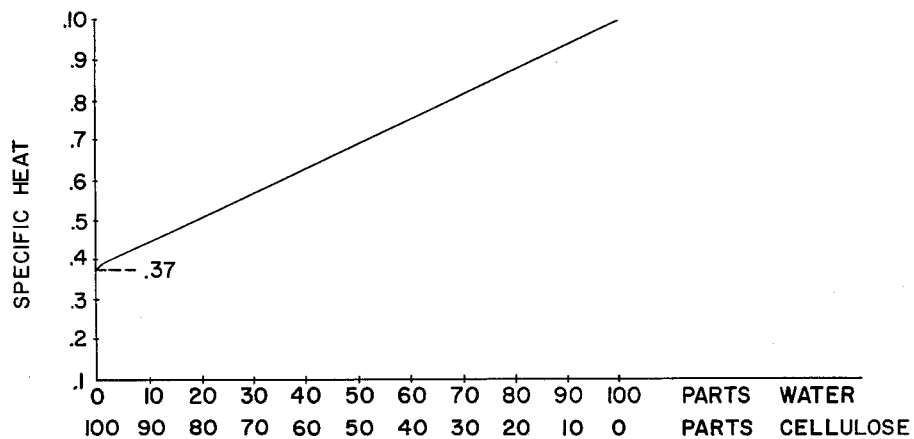
FIG. 3 is a graph illustrating the variation of specific heat as a function of the water content of paper.

The measuring elements described above and illustrated in FIG. 1 provide, in operation on a moving process sheet, information from which the specific heat may be obtained. Information is provided on the velocity of flow of the process material, the rise in temperature of the process material produced by the addition of a known amount of heat to it, and the weight per unit area of the process material sheet. From this information, the specific heat of the process material may be derived in a manner which will be described below, and the moisture content can then be determined by means of its relation to the specific heat of the material. FIG. 3, for example, indicates the relationship between moisture content and specific heat for paper, and it is seen that there is a linear variation of specific heat with water content.

As previously indicated, the specific heat of a material may be expressed mathematically by the equation $$c = \frac{H}{M \Delta T}$$

In the apparatus depicted in FIG. 1, $\Delta T$, the change in temperature, is obtained as the difference between the reading of thermal gauge 20, the output of which will be designated as $T_1$, and the temperature indicated by thermal gauge 21, the output of which will be designated as $T_2$. A measure of the heat supplied to the process material is obtained from the heat source by measuring the power supplied as a function of time to the heat source and applying an appropriate figure for the conversion efficiency and transfer efficiency of the particular type of heat source in the geometry employed. In the case of an electrical heat source, the current drawn by the unit, adjusted by a suitable conversion factor, provides this information. The mass of the process material can be obtained by taking the weight per unit area of the material which is the output provided from gauge 22 and multiplying it by the area to which the heat has been applied. This area is generally rectangular and has a width which remains fixed and is controlled by the geometric configuration of the heat source and a length which will, of course, vary with a velocity of the material. The tachometer drive 14 output indicates the velocity on a continuous basis, which information provides, for a given time constant, the length to be used in computing the area. The apparatus then provides for each successive segment of the process material information as to the mass, amount of heat added and change in temperature occasioned by the addition of this heat. From this information the specific heat may be calculated, as indicated by the equation above. A convenient method for automated equipment is to program a conventional analog or digital computer to perform this function.

Figure 2:
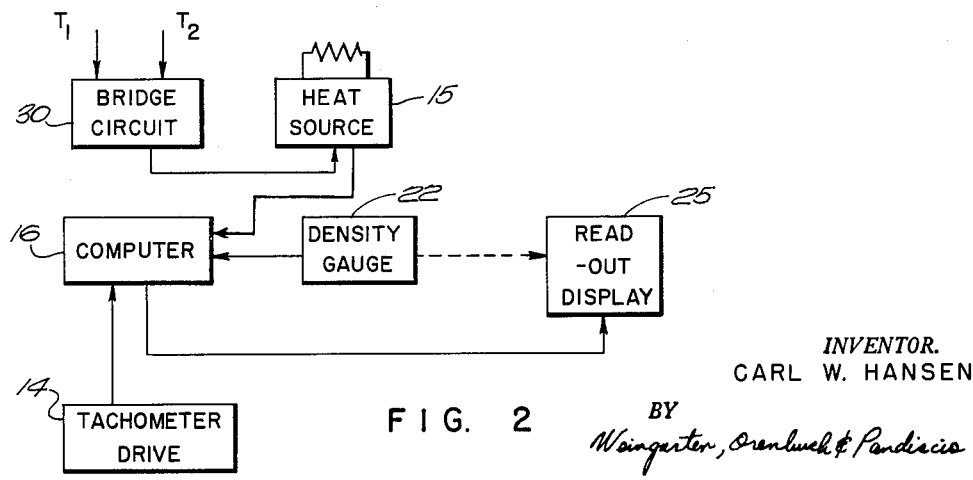
FIG. 2 is an illustration in block diagrammatic form of the circuitry employed in the apparatus of FIG. 1.

Referring now to FIG. 2, the circuit diagram for supplying the information to a computer in appropriate form to be correlated is shown. The output of thermal gauge 20 (indicated as $T_1$) and the output of gauge 21 (indicated as $T_2$) are provided as independent inputs to a bridge circuit 30 which is also connected to heat source 15 and computer unit 16. The bridge circuit is operated in conjunction with a servo system which operates to maintain the temperature difference between $T_1$ and $T_2$ constant by adjusting the amount of heat supplied to the process material, and the information supplied to computer unit 16 from the bridge circuit is then a measure of the amount of heat per unit time required to be supplied to maintain this constant temperature difference. The tachometer drive output 14 is also supplied to computer unit 16 as is the output of density gauge 22. In this circuit, the density gauge is shown connected to display unit 25 in addition to being connected to the output of computer 16, since in many processes the density of the material in the process line is a characteristic which is required to be known in addition to the moisture content of the material. The computer unit 16 may be any conventional type of digital or analog computer which is capable of solving the equation above to obtain the value of specific heat. This value may then be presented in the form of moisture content by applying a multiplying factor. These factors are obtained by reference to a curve, as indicated, for example, in FIG. 3, relating specific heat to moisture content for the particular material under consideration.

The power required to be supplied in terms of heat to the process line in a typical paper mill application would normally be less than a few hundred watts to obtain a temperature difference of one degree centigrade which can be measured with reasonable accuracy by techniques of thermistor thermal gauges.

While the invention has been described chiefly in terms of application to a process material sheet, it is equally applicable to the determination of moisture content in bulk materials in a process line, where the specific heat of the bulk material varies sufficiently with the moisture content. Nor is the invention limited to apparatus embodying a radioactivity type of density gauge, but rather any gauge which supplies the mass of the material with reasonable accuracy may be utilized.

In view of the fact, therefore, that numerous modifications and departures may now be made by those skilled in this art, the invention herein is to be construed as limited only by the spirit and scope of the appended claims.

What is claimed is:

1. Apparatus for determining the moisture content of materials of known composition in a process stream comprising density measuring means disposed adjacent to said process material stream and adapted to provide output signals representative of the variations of density of the material in said process stream; first temperature indicating means disposed adjacent to said process material stream and adapted to provide an output signal representative of the variations of temperature of said process stream material in the region adjacent to said first temperature indicating means; a heat source located adjacent to said process material stream and at a point downstream from said first temperature indicating means, said heat source being adapted to provide heat at a predetermined rate to said process material in the region adjacent to said heat source; means adapted to provide an output signal representative of said rate at which heat is supplied to said process material by said heat source; second temperature indicating means located adjacent to said process material stream at a point downstream of said heat source and adapted to provide an output signal representative of the variations of temperature of said process material at a point adjacent to said second temperature indicating means; means adapted to measure the variations in velocity of flow of said materials in said process stream; signal generating means adapted to correlate said output from said density measuring means and said velocity measuring means and to provide an output signal representative of the variations in mass of said material in said process stream, computing means responsive to said output signals from said first and said second temperature indicating means, said heat source and said signal generating means, said computing means providing an output signal indicating the variations in specific heat computed according to the formula $$c = \frac{H}{M \Delta T}$$

where H equals the heat supplied to said process material, M equals the mass of said material and $\Delta T$ equals the change in temperature of said mass of material, whereby said moisture content of said material can be determined according to a predetermined relationship between the moisture content of materials of said known composition and the specific heat of materials of said known composition.

2. Apparatus for determining the moisture content of materials of known composition in a process stream comprising density measuring means disposed adjacent to said process material stream and adapted to continuously measure and provide an output signal indicative of the variations in density of material in said process material; a first temperature indicating means located adjacent to said process material stream and adapted to provide an output signal indicative of the variations in temperature of said material in the region adjacent to said first temperature indicating means; a heat source located adjacent to said process material stream and adapted to supply heat to the region of said process material adjacent to said heat source; second temperature indicating means located adjacent to said process material stream at a point downstream from said heat source, said second temperature indicating means providing an output signal indicative of the variations in temperature of said process material in a region adjacent to said second temperature indicating means; heat control means responsive to the output signals from said first and second temperature indicating means, said heat control means being adapted to control the quantity of heat generated by said heat source in a manner to maintain a constant predetermined temperature difference between said first and said second temperature indicating means; signal generating means coupled to said heat control means and adapted to provide as an output a signal representative of the variation in quantity of heat supplied to said process material; velocity measuring means adapted to provide an output signal represenattive of the variations in velocity of flow of said materials in said process stream; mass indicating means responsive to said output signal from said density measuring means and said output signal of said velocity means for providing an output signal indicative of variations in mass of said material of said process stream; computing means responsive to said output signals indicative of the variations in mass and quantity of heat supplied to said process material for providing an output signal indicative of the variations of specific heat computed according to the expression $$c = \frac{H}{M \Delta T}$$

where H equals quantity of heat supplied, M equals the indicated mass of the material and ΔT equals said constant predetermined temperature difference, whereby said moisture content of said material can be determined according to the predetermined relation between the moisture content of material of said known composition and the specific heat of material of said known composition.

3. Apparatus in accordance with claim 2 wherein said density measuring means comprises a source of radioactivity providing a beam of radiation incident upon said process material stream and a radioactivity detector for measuring and providing an output signal indicative of the variation in quantity of radiation transmitted through sad process material stream.

4. Apparatus for determining the moisture content of materials of known composition in a process stream comprising a radioactive source located adjacent to said process material stream and adapted to provide a beam of radiation incident upon said process material stream; a radioactivity detector adapted to measure the variation in that portion of said radiation beam which is transmitted through said process material and thereby provide an output signal indicative of the variations in density of the process material; a first temperature measuring means positioned adjacent to said process material stream and adapted to provide an output signal indicative of the variations in temperature of said process material in a region adjacent to said first temperature measuring means; a second temperature measuring means located at a point downstream from said first temperature measuring means and adapted to provide an output signal indicative of the variations in temperature of said process material in a region adjacent to said second temperature measuring means; a heat source disposed adjacent to said process material stream intermediate said first and said second temperature measuring means and adapted to provide heat to said process material stream in a region adjacent to said heat source, said heat source being adapted to provide an output signal indicative of the rate at which heat is supplied to said process material; means adapted to measure and provide an output signal representative of the variations in velocity of flow of said material process stream; mass measuring means responsive to said velocity indicating output signal and said output signals indicative of variations in density to provide an output signal indicative of variations of mass of said material; and means responsive to said output signals from said mass measuring mean, said first and said second temperature measuring means and said heat source to provide an output signal indicative of specific heat of said material computed according to the expression $$c = \frac{H}{M \Delta T}$$

where H equals the quantity of heat supplied to said process material stream from said heat source, M equals the mass of said process material and ΔT equals the change in temperature of said material, whereby the moisture content of said materials may be determined according to the predetermined relationship between the moisture content of materials of said known composition and the specific heat of materials of said known composition.

5. The method of determining variations in the moisture content of a material of known composition in a continuous flow process stream comprising the steps of, adding a measured quantity of heat per unit time to a predetermined width portion of said material, measuring the change in temperature per unit time of said predetermined width portion, determining the variations in weight per unit time of said predetermined width portion, measuring the variations in velocity of said predetermined portion, determining from the variations in said weight per unit time and the variations in said velocity the variations in mass per unit time of said predetermined width portion and determining the variations in specific heat of said predetermined width portion by combining said measured quantity of heat, said measured change in temperature and said variations in mass according to the expression $$c = \frac{H}{M \Delta T}$$

where H equals the quantity of heat supplied per unit time, M equals the mass of said predetermined width portion per unit time and ΔT equals the change in temperature of said predetermined width portion for a unit of time, and thereafter indicate the variations in moisture content of said predetermined width portion according to a predetermined relationship between the specific heat of a material of said known composition and the moisture content of said material of know composition.

References Cited by the Examiner
UNITED STATES PATENTS

| 1,509,869 | 9/24 | Harvey | 73—75 |
| 1,898,066 | 2/33 | Schweitzer et al. | 73—75 |
| 2,304,910 | 12/42 | Hare | 73—32 |
| 2,966,628 | 12/60 | Bosch | 73—73 X |

RICHARD C. QUEISSER, *Primary Examiner.*

ROBERT EVANS, JOSEPH P. STRIZAK, *Examiners.*